Aug. 30, 1932.   J. T. ATWOOD   1,874,415
HINGE AND METHOD OF MAKING THE SAME
Filed Dec. 21, 1928
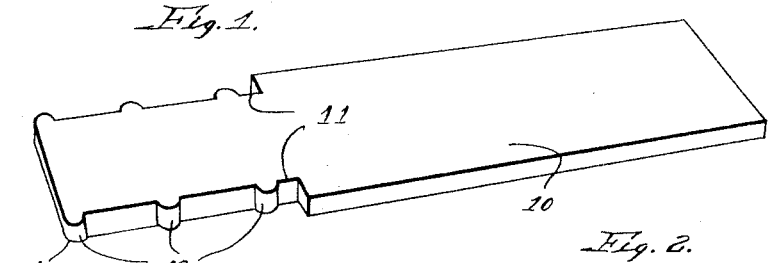
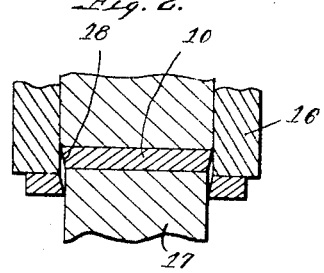
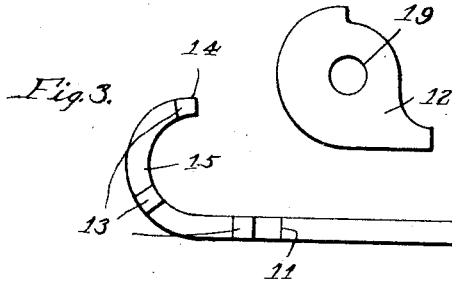
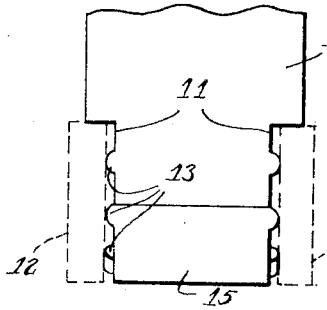
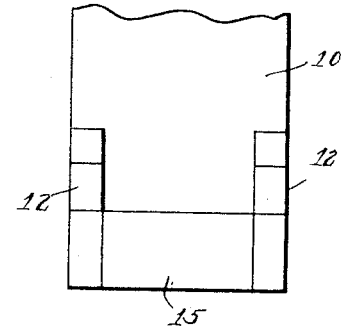
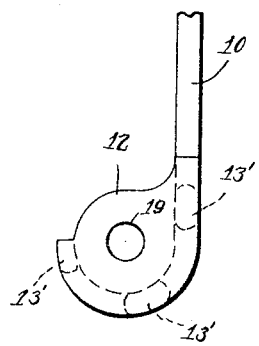
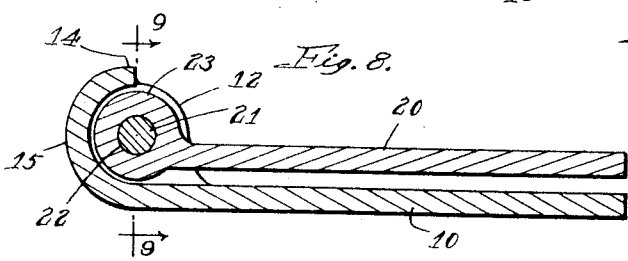
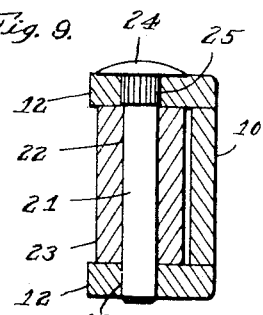
Inventor
James T. Atwood
By Wilson & McCamus
Attys.

Patented Aug. 30, 1932

1,874,415

UNITED STATES PATENT OFFICE

JAMES T. ATWOOD, OF ROCKFORD, ILLINOIS

HINGE AND METHOD OF MAKING THE SAME

Application filed December 21, 1928. Serial No. 327,506.

This invention relates to a covered joint hinge, such as is used in the mounting of automobile doors, and the novel method of making the same.

The making of covered joint hinges has heretofore invariably involved casting or forging and milling and other machining operations with proportionate expense, so that there has always been a demand for a good covered joint hinge made in some other way so as to be available at a lower cost. According to the present invention I propose to form the outer hinge member with the body portion cut from flat bar stock with one end curled to provide the curved cover portion, and then to complete the hinge member by welding to the opposed edges of the curled end thereof a pair of stamped sheet metal plates to form the top and bottom cover flanges between which the knuckle of the inner hinge member is arranged to be received on the pintle passed through registering holes in said flanges and in said knuckle, thus affording a low cost hinge of the self-same flush appearance and serviceability as those made with the other costlier processes. The pintle holes in the top and bottom cover flanges may be punched therein when the plates are stamped from the sheet metal and can be brought in alignment by locating pins entering the same during the welding operation. It is a special feature of my invention, as will presently appear, to form projections on the curled end of the blank forming the body portion of the hinge member to permit the fastening of the flanges in a highly practical manner by projection welding. These projections are arranged to be left on the end of the blank in a punching operation in which the edges of the blank at the end to be curled are cut away for the accommodation of the plates which are to form the cover flanges.

The invention is illustrated in the accompanying drawing wherein:—

Figure 1 is a perspective view of the blank cut from bar stock and punched to cut away some of the stock from the edges thereof at the end to be curled, leaving the projections to be used in the welding operation;

Fig. 2 is a fragmentary view illustrating the punching operation showing how tapered edges are formed as a result of the provision of clearance between the punch and die sufficient for the purpose;

Fig. 3 is an edge view of the blank showing the one end curled ready for the welding thereto of the plates which are to form the top and bottom cover flanges;

Fig. 4 is a side view of one of the aforesaid plates stamped from sheet metal to the form shown;

Fig. 5 is a view looking at the inside of the blank shown in Fig. 3 and indicating in dotted lines how the plates of Fig. 4 are arranged to be positioned preparatory to the simultaneous application of pressure and performance of the welding operation to produce what is shown in Fig. 6;

Fig. 7 is a side view of Fig. 6 indicating in dotted lines the welded areas;

Fig. 8 is a central longitudinal section through a completed hinge, and

Fig. 9 is a cross-section taken on the line 9—9 of Fig. 8 looking in the direction of the arrows.

The same reference numerals are applied to corresponding parts throughout the views.

The present invention, as stated before, relates principally to the outside member of a covered joint hinge, that is, to the member which has the cover portion or hood which protects the knuckle joint, and contemplates broadly the use of a sheet metal blank curled at one end, as between dies, or fashioning to such form in any suitable manner to provide the cover portion, and also contemplates broadly the use of separate plates joined to the blank at its curled end, as by welding, to provide the top and bottom cover flanges. By making the hinge member in this way I avoid practically all of the difficulties which go with the fashioning of such a part from a single blank by any of the methods practiced heretofore, and produce a product which is much cheaper and still just as neat appearing and serviceable as its predecessors.

Referring to the drawing, a blank 10 destined to be the body portion of an outside hinge member is cut from flat bar stock of the desired thickness and of suitable hardness. The bar stock from which the blank is cut is preferably of just the right width for the shank of the hinge member so that no subsequent trimming is necessary. The one end of the blank, which is later to be curled to form the cover portion, is punched to cut away enough stock from both side edges of the blank, as at 11, to accommodate plates 12 (see Fig. 4) which are destined to form top and bottom cover flanges on the hinge member. In this punching operation a plurality of projections 13, three in the present case, are arranged to be left on either edge of the blank for a purpose which will presently appear, these projections being fairly short, say, about one sixteenth of an inch or so long. The end of the blank is preferably swedged on the outside thereof, as represented at 14, suitably at the time of the punching operation so that the blank is thereafter ready to have the end thereof curled to the form shown in Fig. 3. The curling may be done between dies in some such manner as illustrated and described in Kenyon application, Serial No. 40,759, filed July 1 1925, and the portion indicated by the reference numeral 15, which results from this forming operation, constitutes the cover portion of the hinge member. Where it is desired to have a crown effect the blank is tapered off on one side along opposed edges by milling or broaching substantially as described in Atwood application, Serial No. 187,725, filed April 30, 1927. Where that is done the swedging at 14 can be taken care of in the same operation. Now, in the curling of the end of the blank there is perceptible crowding of the stock on the inside of the blank and if the flat blank were punched so that the inside width were equal to the outside width, it would be found that after the curling of the blank the width inside would be greater than that outside, which would necessitate a milling operation to trim the edges flat and in true parallelism. I avoid this extra operation by taking the precaution in the punching operation, as shown in Fig. 2, of providing the requisite amount of clearance between the punch 16 and die 17, thus causing the shear to occur on a diagonal plane so that the edges 18 are inclined inwardly from the outside of the blank to make the width across the inside thereof appreciably smaller than that across the outside, this difference being enough to compensate for the spreading of the inside of the blank in the curling thereof, to the end that after the curling the blank will be found to be of approximately the same width across the inside at the curled end thereof as across the outside. The blank formed up, as shown in Fig. 3, is ready for the application of the plates. Projection welding is preferred for this purpose, although flash or butt welding might be found suitable, or some other kind of welding or fastening.

The plates 12 are arranged to be stamped from sheet metal of the desired thickness and hardness to the form shown in Fig. 4 and are also arranged to have holes 19 punched therein, preferably at the same time, so as to be sure that the holes are properly located. Owing to the small size of the plates, it is possible to use scrap and that, of course, means quite a saving in the cost of materials. A pair of these plates are arranged to be placed in the positions indicated by dotted lines in Fig. 5 with the blank held firmly enough to permit the application of pressure on the plates up to about four thousand pounds during the welding operation. In the latter operation, known as projection welding the projections 13 are instantly fused and the metal caused to blend with the metal of the plates, as indicated by the dotted areas 13' in Fig. 7. It should be understood that while I have shown only three projections to produce that many welded areas the number might be increased as seen fit, or, for that matter, might even be decreased if the conditions appeared to warrant. The plates are definitely located with the holes 19 in absolute alingnment suitably by the entry of locating dowel pins therein, in a manner common to the performance of other similar types of operations which need not be enumerated. The resulting hinge member is shown in Figs. 6 and 7, in which it will be observed that the plates 12 lie absolutely flush with the edges of the rest of the blank and, to all intents and purposes, appear as much integral with the rest of the blank as they would if the hinge member were formed completely from a single blank. The joints at the plates 12 are absolutely closed owing to the application of heavy pressure during the welding operation and are rendered still further indistinguishable in the finish grinding of the hinge member. In the grinding operation the edges of the plates 12 may be rounded off, as appears in Fig. 9, to give a more finished appearance.

With the outer hinge member completed in the manner above described the same is arranged to have an inner hinge member 20 fastened thereto by a pintle 21 to complete a covered joint hinge. The shanks of both hinge members will, of course, be suitably pierced and counterbored to provide screw holes (not shown) preferably before the said members are fastened together. The pintle 21 is arranged to have a working fit in the hole 22 bored through the knuckle end 23 of the inner hinge member 20 but is arranged to be held against turning by having a drive fit in the holes 19 provided in the top and bottom cover flanges (12) of the outer hinge member, the shank of the pintle being knurled or serrated for a small portion of the length thereof immediately below the head 24, as shown at 25, to insure a good purchase for the pintle in the hole in the top cover flange.

It should be clear from the foregoing description that my invention avoids many objections that went with other methods of manufacture. For example, where the pintle supports were formed directly on the blank by forging or cold forming, that required the use of steel having a low carbon content. The metal was, therefore, too soft to make for good durability. On the other hand, where sheet metal was used and the pintle supports were formed directly on the body portion of the hinge member by suitable fashioning of the sheet metal, that required the use of such thin metal that the resulting hinge was very flimsy and weak and not rigid enough for most practical purposes. With my method of manufacture straight strip or bar stock of the desired thickness can be used for the body and other stock of the desired thickness and hardness can be used for the side plates, scrap stock being often used if it is of the right thickness and hardness. The metal used for the pintle supports, in other words, can be selected for its carbon content and thickness without keeping in mind such considerations as otherwise had to be kept in mind where the metal had to be forged or formed cold. The metal of the pintle supports can, therefore, be as hard as desired and as thick, thus building into the hinge the desired strength and rigidity and long life, while at the same time making the construction very economical.

It is believed the foregoing description conveys a clear understanding of my invention. The appended claims have been drawn with a view to affording a degree of protection commensurate with these improvements.

I claim:

1. The method of making the outside member of a covered joint hinge consisting in providing a flat blank of the desired thickness destined to serve as the body portion, then cutting away stock from the opposed edges thereof at one end to provide recesses of a predetermined depth, then curling this end of the blank in any suitable manner to provide a curved cover portion, providing separate plates of the desired thickness and hardness destined to serve as top and bottom cover flanges rigid and strong enough to serve as the sole pintle supports, and finally fastening said pair of plates by their marginal edge portions to the opposed edges of the recessed and curled end of the blank to serve as top and bottom cover flanges between which the knuckle of an inside hinge member is adapted to be received within the cover portion on a pintle mounted in said flanges.

2. The method of making the outside member of a covered joint hinge consisting in providing a flat blank of the desired thickness destined to form the body portion, providing a pair of separate plates of the desired thickness and hardness destined to form top and bottom cover flanges on the body portion, then cutting away stock from opposed edges of one end of the blank approximately to the extent of the thickness of each of said plates but leaving a plurality of spaced projections on each of the opposed edges of the blank and curling this end of the blank in any suitable manner to form a curved cover portion, and finally fastening the marginal portions of the plates to the opposed edges of this end of the blank by projection welding using the aforesaid projections for the purpose, the said plates when so fastened filling the recesses and serving as top and bottom cover flanges between which the knuckle of an inside hinge member is adapted to be received within the cover portion on a pintle mounted in said flanges.

3. The method as set forth in claim 2 wherein in the cutting away of stock from the opposed edges of the one end of the blank the said end is brought to a smaller width across the side destined to be the inside of the body portion than across the outside, whereby the subsequent curling can be performed without danger of the inside width exceeding the outside width.

4. The method as set forth in claim 2 wherein the cutting away of stock from opposed edges of one end of the blank is performed in a punching operation wherein sufficient clearance is provided between the punch and die to cause the shear to occur on diagonal planes resulting in proportionately diminishing the width across the side of the blank destined to be the inside of the body portion, substantially as and for the purposes described.

5. The method of making the outside member of a covered joint hinge consisting in providing a flat blank of the desired thickness and hardness destined to serve as the body portion, then cutting away stock from the opposed edges thereof at one end to provide recesses of a predetermined depth and curling this end of the blank in any suitable manner to provide a curved cover portion, providing separate plates of the desired thickness and hardness destined to serve as top and bottom cover flanges rigid and strong enough to serve as the sole pintle supports, and finally welding the said plates by their marginal edge portions to the opposed edges of the recessed and curled end of the blank to serve as top and bottom cover flanges between which the knuckle of an inside hinge member is adapted to be received within the cover portion.

6. The method of making the outside member of a covered joint hinge consisting in providing a pair of separate plates of a predetermined thickness and desired hardness, and a blank body portion suitably formed at one end to provide a curved cover portion having portions of opposed edges cut away to a depth approximately equivalent to the thickness of said plates, and fastening the marginal edge portions of said plates to the opposed edges of said end in the cut away portions by welding, such as by projection, flash or butt welding, the said plates when fastened in place being substantially flush with the rest of the edges of said body portion and serving as top and bottom cover flanges between which the knuckle of an inside hinge member is adapted to be received within the cover portion on a pintle mounted in said flanges.

7. The method of making the outside member of a covered joint hinge consisting in providing a flat blank of the desired thickness destined to form the body portion, providing a pair of separate plates of the desired thickness and hardness destined to form top and bottom cover flanges on the body portion, then cutting away stock from opposed edges of one end of the blank approximately to the extent of the thickness of each of said plates but leaving one or more projections on each of the opposed edges and curling this end of the blank in any suitable manner to form a curved cover portion, and finally fastening the marginal portions of said plates to the opposed edges of this end of the blank by welding, such as by projection, flash or butt welding, using the aforesaid projections for the purpose, the said plates when so fastened filling the recesses and serving as top and bottom cover flanges between which the knuckle of an inside hinge member is adapted to be received within the cover portion on a pintle mounted in said flanges.

8. The method as set forth in claim 7 wherein in the cutting away of stock from the opposed edges of the one end of the blank the said end is brought to a smaller width across the side destined to be the inside of the body portion than across the outside, whereby the subsequent curling can be performed without danger of the inside width exceeding the outside width.

9. The method as set forth in claim 7 wherein the cutting away of stock from opposed edges of one end of the blank is performed in a punching operation wherein sufficient clearance is provided between the punch and die to cause the shear to occur on diagonal planes resulting in proportionately diminishing the width across the side of the blank destined to be the inside of the body portion, substantially as and for the purposes described.

In witness of the foregoing I affix my signature.

JAMES T. ATWOOD.